(12) United States Patent
Hirai

(10) Patent No.: US 9,137,464 B2
(45) Date of Patent: Sep. 15, 2015

(54) IMAGE PROCESSING APPARATUS AND CONTROL METHOD OF THE SAME

(75) Inventor: Yuichi Hirai, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 324 days.

(21) Appl. No.: 13/880,953

(22) PCT Filed: Nov. 2, 2011

(86) PCT No.: PCT/JP2011/075880
§ 371 (c)(1),
(2), (4) Date: Apr. 22, 2013

(87) PCT Pub. No.: WO2012/063885
PCT Pub. Date: May 18, 2012

(65) Prior Publication Data
US 2013/0222531 A1 Aug. 29, 2013

(30) Foreign Application Priority Data

Nov. 8, 2010 (JP) .................................. 2010-250257

(51) Int. Cl.
*H04N 9/64* (2006.01)
*H04N 5/357* (2011.01)
(Continued)

(52) U.S. Cl.
CPC ............ *H04N 5/357* (2013.01); *G06T 5/002* (2013.01); *G06T 5/50* (2013.01); *H04N 1/58* (2013.01); *H04N 9/045* (2013.01); *H04N 9/646* (2013.01);
(Continued)

(58) Field of Classification Search
CPC ....... H04N 9/045; H04N 9/646; H04N 5/217; H04N 5/361; H04N 5/3575

USPC ............................................ 348/32, 241, 242
See application file for complete search history.

(56) References Cited

U.S. PATENT DOCUMENTS 5,467,404 A    11/1995   Vuylsteke et al.
6,930,711 B2    8/2005   Fukui et al.
(Continued)

FOREIGN PATENT DOCUMENTS

CN    101480057 A    7/2009
JP     8-23541 A     1/1996
(Continued)

OTHER PUBLICATIONS

Chinese Office Action dated Oct. 30, 2014 for counterpart Chinese Patent Application No. 201180053860.6.

*Primary Examiner* — Michael Lee
(74) *Attorney, Agent, or Firm* — Fitzpatrick, Cella, Harper & Scinto

(57) ABSTRACT

A low-resolution image having a low resolution and low frequency band is generated from an image sensed by using a single board color image sensor, and pseudo color suppression and color noise suppression are performed on each of the image and low-resolution image. The resolution of the low-resolution image is then restored, and weighted combination is performed on this image and the former image. If it is determined that a pixel of interest belongs to a region where a pseudo color is generated, a MIX ratio calculator (205, 225) for calculating a ratio coefficient for combination calculates a ratio coefficient by which a color signal of a pixel of the low-resolution image having the restored resolution is the result of the weighted combination. This makes it possible to effectively suppress both a pseudo color and color noise.

6 Claims, 5 Drawing Sheets

(51) Int. Cl.
*H04N 1/58* (2006.01)
*H04N 9/04* (2006.01)
*G06T 5/00* (2006.01)
*G06T 5/50* (2006.01)

(52) U.S. Cl.
CPC ............ *G06T 2207/10024* (2013.01); *G06T 2207/20016* (2013.01); *G06T 2207/20212* (2013.01)

(56) References Cited

U.S. PATENT DOCUMENTS

| | | | |
|---|---|---|---|
| 7,898,583 B2 | 3/2011 | Wakahara et al. | |
| 8,018,501 B2 | 9/2011 | Sasaki | |
| 8,244,034 B2 | 8/2012 | Ishiga | |
| 2005/0134734 A1 | 6/2005 | Adams, Jr. et al. | |
| 2007/0139538 A1* | 6/2007 | Song et al. | 348/242 |
| 2007/0216785 A1 | 9/2007 | Nomura et al. | |
| 2008/0291312 A1* | 11/2008 | Egawa | 348/308 |
| 2009/0052775 A1* | 2/2009 | Moon et al. | 382/167 |
| 2010/0189350 A1 | 7/2010 | Shohara | |
| 2014/0022421 A1* | 1/2014 | Sawada | 348/242 |

FOREIGN PATENT DOCUMENTS

| | | |
|---|---|---|
| JP | 2002-300590 A | 10/2002 |
| JP | 2007-272536 A | 10/2007 |
| JP | 2007-336384 A | 12/2007 |
| JP | 2008-15741 A | 1/2008 |

* cited by examiner

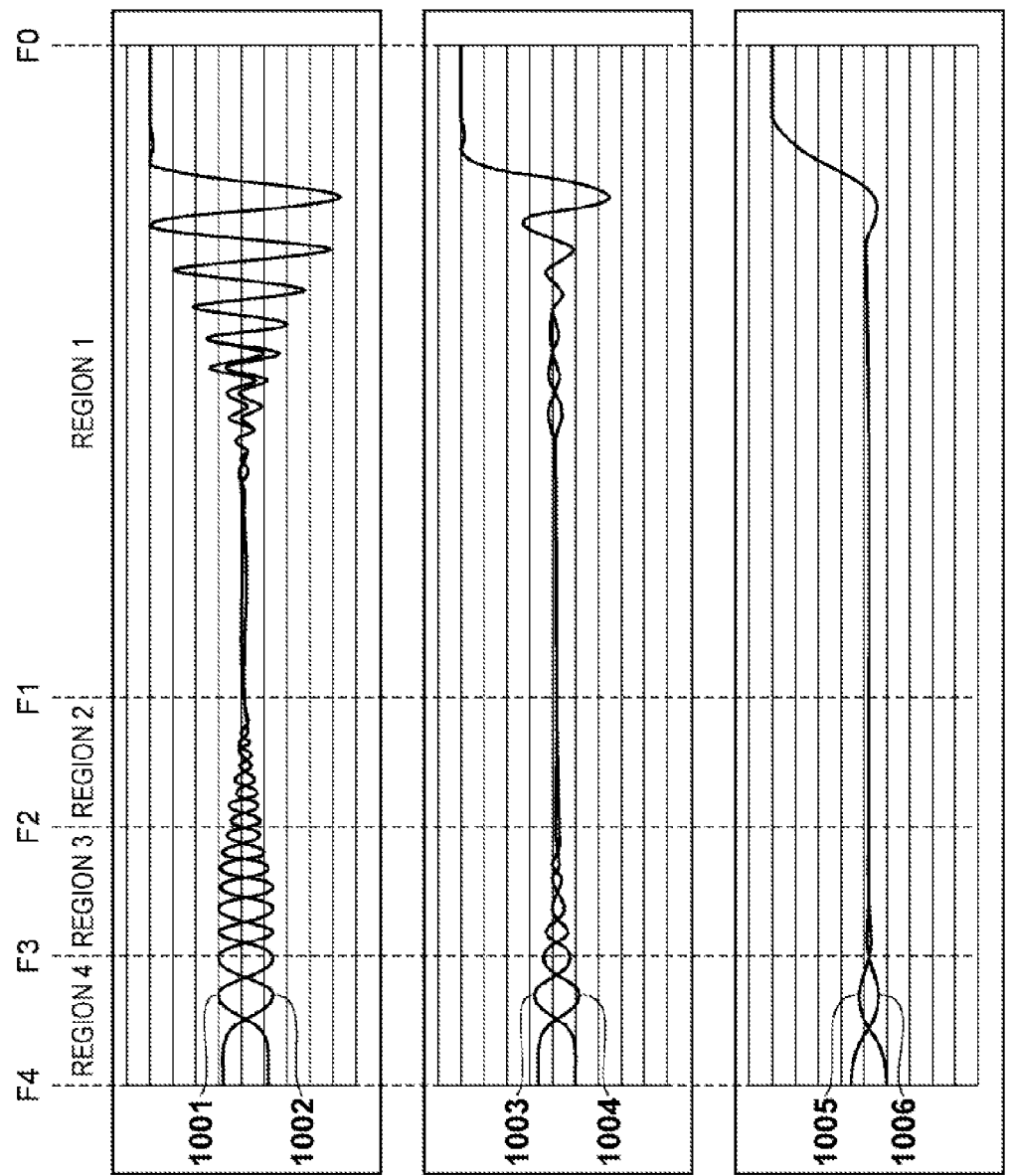

IMAGE PROCESSING APPARATUS AND CONTROL METHOD OF THE SAME

TECHNICAL FIELD

The present invention relates to an image processing apparatus and a control method of the same and, more particularly, to an image processing apparatus capable of suppressing noise and a pseudo color in an image.

BACKGROUND ART

An image capturing apparatus such as a digital camera that includes a single board color image sensor, for example, a CCD image sensor or CMOS image sensor and stores an optical image as digital image data is known. Although an image capturing apparatus like this is desirably capable of capturing high-quality images, noise (color noise) of a color component largely decreases the image quality in an environment in which no sufficient S/N ratio (signal/noise ratio) can be obtained, for example, in a dark place or at night. Another example of the factor that decreases the image quality is the superimposition of a noise component resulting from, for example, a dark current of an image sensor.

Demands, however, have particularly recently arisen for capturing low-noise, high-quality images even in a dark place or at night.

Under the technical circumstance as described above, various methods for suppressing color noise have been proposed. For example, Japanese Patent Laid-Open No. 2008-015741 (patent literature 1) has proposed a method of combining high-frequency components with low-frequency components after removing noise from the high-frequency components while saving edge components. Also, Japanese Patent Laid-Open No. 2007-272536 (patent literature 2) has proposed a method of generating a low-frequency image and high-frequency image different in resolution for each of a luminance component and color-difference component, performing different noise suppressing processes on these images, and then combining the images.

Each of the methods described in patent literatures 1 and 2 has an arrangement in which the luminance component and color component are divided into high- and low-frequency components, and combined after the noise suppressing processes are individually performed on them.

Furthermore, in the process of processing an image sensed by a single board color image sensor using color filters, a problem called a pseudo color arises in which an originally nonexistent color appears in a portion where an image of a subject having a high spatial frequency is captured. As a method of suppressing this pseudo color generated in a high-frequency region of a subject, therefore, color interpolation of a pixel of interest is conventionally performed using pixels around the pixel of interest.

Each of Japanese Patent Laid-Open No. 2002-300590 (patent literature 3) and Japanese Patent Laid-Open No. H08-023541 (patent literature 4) has proposed a method of performing color interpolation suppressing a pseudo color on an image obtained from an image sensor including color filters having a Bayer arrangement. The unit pattern of a primary color Bayer arrangement is

Of two green (G) filters included in this unit pattern, a G filter adjacent to a red (R) filter in the horizontal direction and to a blue (B) filter in the vertical direction is a G1 filter, and a G filter adjacent to the R filter in the vertical direction and to the B filter in the horizontal direction is a G2 filter.

When performing color interpolation on a pixel of interest, whether to use the value of a G1 pixel or G2 pixel in order to obtain a color-difference component is determined based on the relationship between the correlation degree of the value of the G1 pixel or G2 pixel vertically adjacent to the pixel of interest and the correlation degree of the value of the G1 pixel or G2 pixel horizontally adjacent to the pixel of interest.

In patent literature 4, a color-difference component R-G is obtained by performing weighted averaging on the value of (R-G1) and the value of (R-G2) in accordance with the difference between them, and a color-difference component B-G is obtained by performing weighted averaging on the value of (B-G1) and the value of (B-G2) in accordance with the difference between them.

Furthermore, Japanese Patent Laid-Open No. 2007-336384 (patent literature 5) has proposed a method of generating a luminance component by adaptively selecting a pixel for use in interpolation in accordance with the correlation of pixels positioned in the horizontal and vertical directions of a pixel of interest, thereby generating a natural image as a whole by suppressing moire.

Patent literatures 1 and 2 take the suppression of color noise into consideration, but do not take account of the suppression of a pseudo color. Also, patent literatures 3 to 5 take account of the suppression of a pseudo color, but do not take the suppression of color noise into account.

It is insufficient to suppress only one of color noise and a pseudo color, and an image in which both color noise and a pseudo color are suppressed is required. However, no conventional method for efficiently suppressing both color noise and a pseudo color has been proposed.

SUMMARY OF INVENTION

The present invention provides an image processing apparatus capable of suppressing both a pseudo color and color noise, and a control method of the same.

According to one aspect of the present invention, there is provided an image processing apparatus for suppressing a pseudo color and color noise of an image sensed by using a single board color image sensor, characterized by comprising: resolution reduction means for generating, from the image, a low-resolution image having a resolution and a frequency band lower than those of the image; suppressing means for suppressing a pseudo color and color noise of each of the image and the low-resolution image; resolution increase means for restoring the resolution of the low-resolution image processed by the suppressing means; calculating means for calculating a ratio coefficient for performing weighted combination on a pixel of the image processed by the suppressing means, and on a pixel, which corresponds to the former pixel, of the low-resolution image having the restored resolution; and combining means for performing weighted combination on a color signal of the pixel of the image processed by the suppressing means, and on a color signal of the pixel, which corresponds to the former pixel, of the low-resolution image having the restored resolution, in accordance with the ratio coefficient, wherein if it is determined that a pixel of interest of the image belongs to a region where a pseudo color is generated, the calculating means calculates the ratio coefficient by which the color signal of the pixel of the low-resolution image having the restored resolution is the result of the weighted combination.

According to another aspect of the present invention, there is provided a control method of an image processing apparatus for suppressing a pseudo color and color noise of an image sensed by using a single board color image sensor, characterized by comprising: a resolution reduction step of causing resolution reduction means to generate, from the image, a low-resolution image having a resolution and a frequency band lower than those of the image; a suppression step of causing suppressing means to suppress a pseudo color and color noise of each of the image and the low-resolution image; a resolution increase step of causing resolution increase means to restore the resolution of the low-resolution image processed in the suppression step; a calculation step of causing calculating means to calculate a ratio coefficient for performing weighted combination on a pixel of the image processed in the suppression step, and on a pixel, which corresponds to the former pixel, of the low-resolution image having the restored resolution; and a combination step of causing combining means to perform weighted combination on a color signal of the pixel of the image processed in the suppression step, and on a color signal of the pixel, which corresponds to the former pixel, of the low-resolution image having the restored resolution, in accordance with the ratio coefficient, wherein if it is determined in the calculation step that a pixel of interest of the image belongs to a region where a pseudo color is generated, the calculating means calculates the ratio coefficient by which the color signal of the pixel of the low-resolution image having the restored resolution is the result of the weighted combination.

Further features of the present invention will become apparent from the following description of exemplary embodiments with reference to the attached drawings.

BRIEF DESCRIPTION OF DRAWINGS

FIGS. 5A to 5C are views showing examples of G1 and G2 signals on an axis horizontally extending from the center of the CZP.

DESCRIPTION OF EMBODIMENTS

Exemplary embodiments of the present invention will now be described in detail in accordance with the accompanying drawings.

Figure 1:
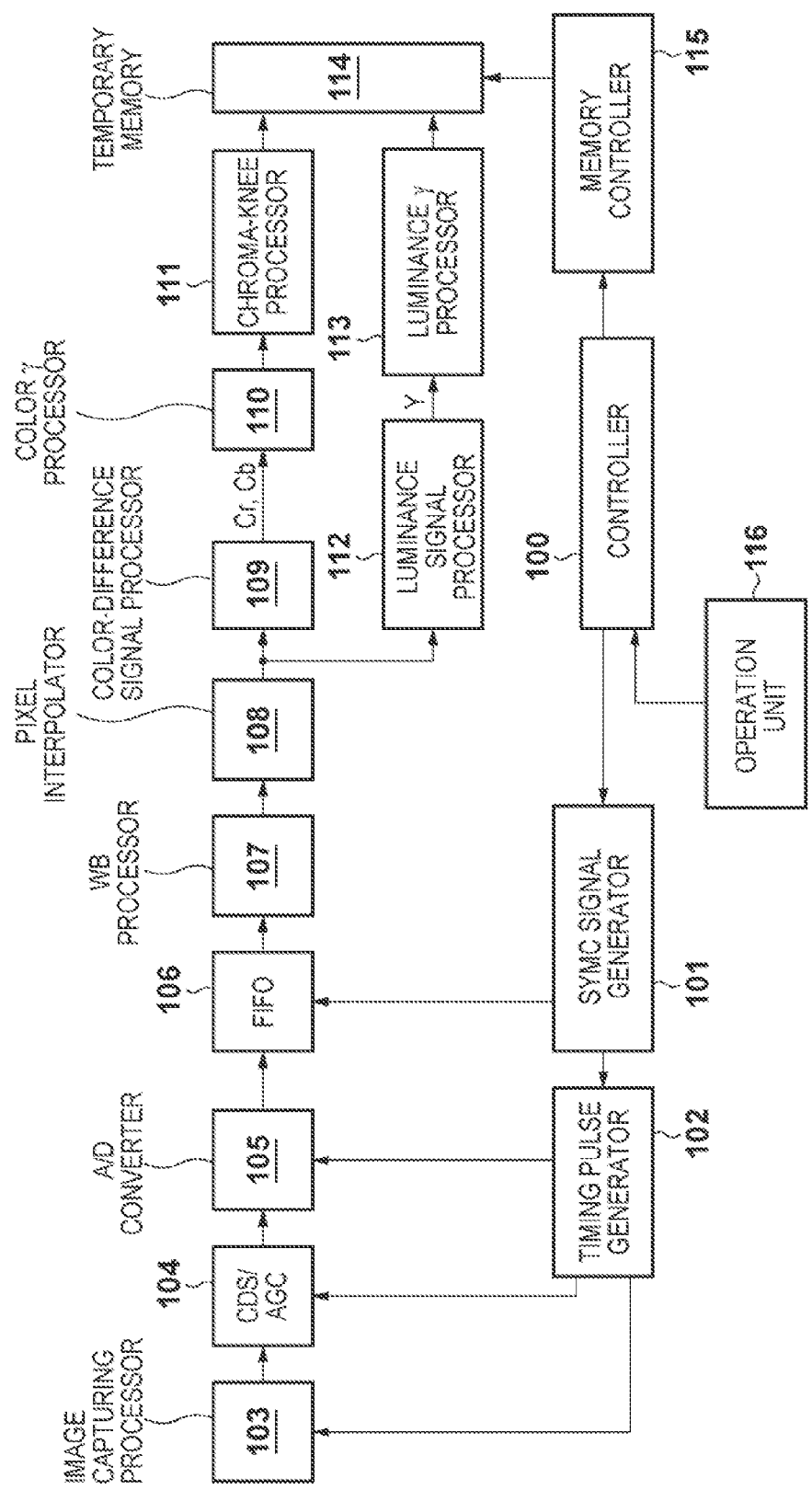
FIG. 1 is a block diagram showing a configuration example of an image capturing apparatus as an example of an image processing apparatus according to an embodiment.

FIG. 1 is a block diagram showing a configuration example of an image capturing apparatus as an example of an image processing apparatus according to an embodiment of the present invention. In the image processing apparatus according to the present invention, however, an arrangement for capturing an image is not essential, and any given device capable of processing a captured image can perform the image capturing process.

A controller 100 includes a CPU, RAM, and ROM, and controls the operation of each unit of the image capturing apparatus by expanding, on the RAM, a program stored in the ROM and executing the expanded program by the CPU. Note that FIG. 1 does not show any connecting lines between the controller 100 and individual functional blocks so as not to complicate the drawing. Note also that functional blocks 107 to 113 shown in FIG. 1 may be implemented by hardware, but in the following explanation they are implemented by executing software by the CPU of the controller 100.

When "image capturing standby" is designated by, for example, pressing an image capturing button of an operation unit 116 halfway, the controller 100 instructs a sync signal generator 101 to generate frame sync signals (horizontal and vertical sync signals) for acquiring an image signal.

In response to this instruction, the sync signal generator 101 instructs a timing pulse generator 102 to supply a timing pulse to blocks pertaining to analog signal processing. When receiving this instruction from the sync signal generator 101, the timing pulse generator 102 supplies the timing pulse to an image capturing processor 103, CDS/AGC 104, and A/D converter 105 pertaining to analog signal processing.

The CDS/AGC 104 removes a dark current component from an analog image signal output from the image capturing processor 103 including a single board color image sensor, and increases the S/N ratio of an image signal by adjusting the gain. The A/D converter 105 converts the analog image signal into digital image data and outputs the data to a FIFO 106 in accordance with the timing supplied from the timing pulse generator 102.

The FIFO 106 functions as a temporary buffer for the digital image data. Functional blocks after the FIFO 106 are blocks pertaining to digital signal processing. A time required for digital signal processing performed from a WB processor 107 is not constant, and it is not always possible to immediately start digital signal processing at the output timing of the A/D converter 105. Therefore, the FIFO 106 absorbs the timing difference.

The WB processor 107 adjusts the gain (white balance) between color pixels in a color image. A pixel interpolator 108 interpolates information of an insufficient color component, for each pixel of an image sensed by an image sensor including color filters. For example, when the image capturing processor 103 includes an image sensor including color filters having the Bayer arrangement described above and a pixel of interest is an R pixel, the image interpolator 108 interpolates B and G color components from surrounding B and G (G1 and G2) pixels. The color interpolating process is also called a synchronizing process. The method of interpolation is not particularly limited, and a given conventional method can be adopted.

A color-difference signal processor 109 generates color-difference signals (Cr and Cb) from an RGB signal of a pixel of interest. A color γ processor 110 performs gamma processing on the color-difference signals. A chroma/knee processor 111 adjusts the saturation gain after the gamma processing. A luminance signal processor 112 generates a luminance signal (Y). The luminance signal processor 112 can generate a luminance signal in accordance with, for example, equation Y=0.6G+0.3R+0.1B. A luminance γ processor 113 corrects the gamma of the luminance signal.

Note that the color-difference signal Cr (Cb) is defined by R-Y (B-Y). However, the color-difference signal Cr (Cb) can also be obtained by regarding Cr as R-G (Cb as B-G) by using G as a simple luminance, because a human has the specific luminous efficiency characteristic that he or she feels green light as brightest light.

A temporary memory 114 stores the generated luminance signal and color-difference signals (color signals). A memory controller 115 controls write/read of the temporary memory 114 under the control of the controller 100.

Next, the arrangement and operation of the color-difference signal processor 109 will be explained with reference to FIG. 2.

The color-difference signal processor 109 repetitively applies a low-pass filter (LPF) and down-sampling unit to an input signal of a pixel of interest, thereby generating an image whose spatial frequency and resolution (the number of pixels) decrease stepwise. For example, when applying down-sampling that reduces the size to ½ in both the horizontal and vertical directions, the color-difference signal processor 109 applies a low-pass filter that sets the frequency characteristic at a Nyquist point to 0, such as a low-pass filter having a filter coefficient [1,2,1].

Figure 2:
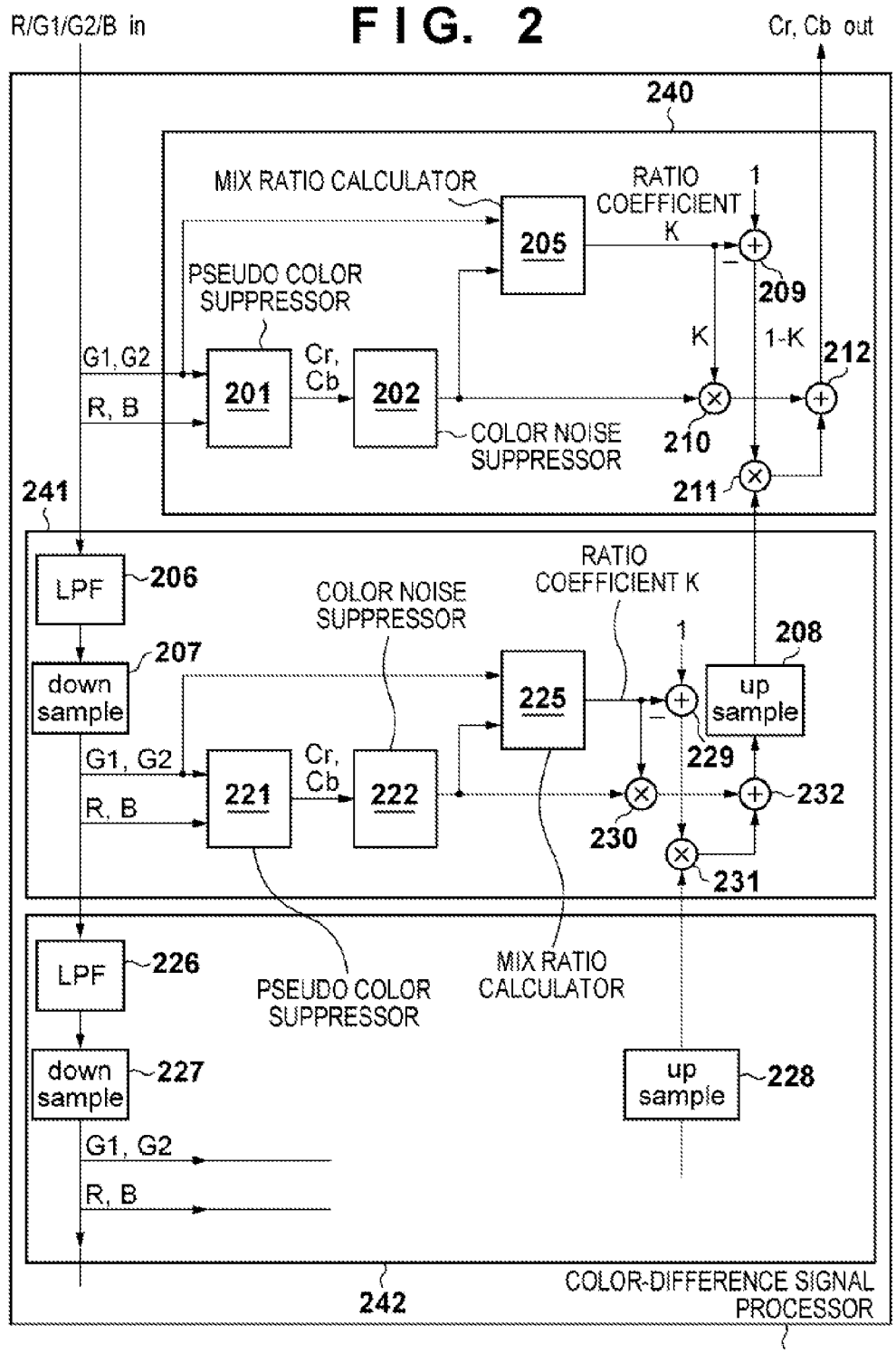
FIG. 2 is a block diagram showing a configuration example of a color-difference signal processor 109 shown in FIG. 1.

FIG. 2 shows a configuration example that generates an image having a ½ resolution in both the horizontal and vertical directions by applying a low-pass filter 206 and down-sampling unit 207, and generates an image having a ¼ resolution in both the horizontal and vertical directions by applying a low-pass filter 226 and down-sampling unit 227. However, it is also possible to generate an image having a lower frequency and lower resolution. The number of steps of images to be generated can properly be determined by taking account of the resolution of an original image and the like. That is, FIG. 2 shows a configuration example that combines three images including the original resolution after suppressing a pseudo color and color noise of each image. However, it is also possible to process images having four or more different resolutions.

In the following explanation, each of functional blocks 240 to 242 for processing an image having a given resolution will be handled as "a layer". Accordingly, FIG. 2 shows a three-layered arrangement. Note that in FIG. 2, the layer 242 for processing an image having a resolution that is ¼ the original resolution has the same arrangement as that of the layer 241 for processing an image having a resolution that is ½ the original resolution, and hence is simply illustrated.

The arrangement and operation of each layer will now be explained. The first layer 240 is a layer for processing an output image from the pixel interpolator 108. A pseudo color suppressor 201 generates color-difference signals Cr and Cb by suppressing a pseudo color, from the color components (RGB components) of a pixel of interest. A color noise suppressor 202 suppresses noise of the color-difference signals Cr and Cb output from the pseudo color suppressor 201, by using, for example, the noise reducing process performed on one of band-separated images in patent literature 1 or 2 described previously. Note that the methods of performing pseudo color suppression and color noise suppression on a given image are well known in this field of art, and these well-known methods can properly be adopted in the present invention as well, so a detailed explanation of the processes of the pseudo color suppressor 201 and color noise suppressor 202 will be omitted.

A MIX ratio calculator 205 calculates, from the color-difference signals Cr and Cb from the color noise suppressor 202, a ratio coefficient K for combining color-difference signals Cr and Cb having undergone pseudo color suppression and color noise suppression in the present layer, and color-difference signals Cr and Cb supplied from a lower layer. If it is determined that the pixel (or region) of interest belongs to a region where the color change is small or a region where a pseudo color is generated, the MIX ratio calculator 205 calculates the ratio coefficient K that raises the combination ratio of the color-difference signals Cr and Cb from the lower layer. Details of the arrangement and operation of the MIX ratio calculator 205 will be described later with reference to FIG. 3.

An adder 209 calculates a coefficient (1−K) by subtracting the ratio coefficient K output from the MIX ratio calculator 205 from 1. A multiplier 210 multiplies, by the ratio coefficient K, the color-difference signals Cr and Cb of the pixel of interest having undergone pseudo color suppression and color noise suppression in the present layer, and outputs the products. A multiplier 211 multiplies, by the coefficient (1−K), the color-difference signals Cr and Cb of the pixel of interest supplied from the lower layer 241, and outputs the products. An adder 212 adds the outputs from the multipliers 210 and 211, and supplies combined color-difference signals Cr and Cb as outputs from the color-difference signal processor 109, to the color γ processor 110.

The second layer 241 is a layer for applying the low-pass filter 206 and down-sampling unit 207 on the output image from the pixel interpolator 108, thereby processing a low-resolution image having a limited band. The arrangements and operations of a pseudo color suppressor 221, color noise suppressor 222, MIX ratio calculator 225, adder 229, multiplier 230, multiplier 231, and adder 232 in the second layer are the same as corresponding arrangements and operations in the first layer, so a repetitive explanation will be omitted. An up-sampling unit 208 increases the resolution of combined color-difference signals Cr and Cb output from the adder 232 to the same resolution as that of the image processed in the first layer. The up-sampling unit 208 has a function of restoring the resolution decreased by the down-sampling unit 207 to the original resolution. When interpolating a pixel C between existing pixels A and B in each of the horizontal and vertical directions, for example, the up-sampling unit 208 can use linear interpolation such as C=(A/2+B/2). Note that the pixel interpolation method for increasing the resolution is not limited, and a well-known interpolation method such as the bicubic method can properly be adopted.

The third layer 242 is a layer for processing a low-resolution image having a further limited band by applying the low-pass filter 226 and down-sampling unit 227 to the output image from the down-sampling unit 207 of the second layer 241. The arrangement and operation of the third layer 242 are the same as those of the second layer 241 except for the band and resolution of an image to be processed, so a repetitive explanation will be omitted. An up-sampling unit 228 converts the resolution of the color-difference signals Cr and Cb processed by the third layer 242 into the same resolution as that of the image processed by the second layer 241, and supplies the color-difference signals Cr and Cb to the multiplier 231.

Note that the third layer 242 is the lowermost layer in the example shown in FIG. 2, but it is also possible to form a lower layer as described previously. Note also that the third layer may be omitted. Although the method of determining the number of layers is not particularly limited, the number of layers can be determined by the resolution of an original image or the number of separated bands for multi-rate signal processing. The multi-rate signal processing is a technique that performs image processing by using an image of a layer meeting the purpose among images to be processed by individual layers, by using the characteristic that a low-resolution image has a high S/N ratio and a high-resolution image has a low S/N ratio. This multi-rate signal processed is well known in this field of art and has no direct relation to the present invention, so a detailed explanation will be omitted.

Figure 3:
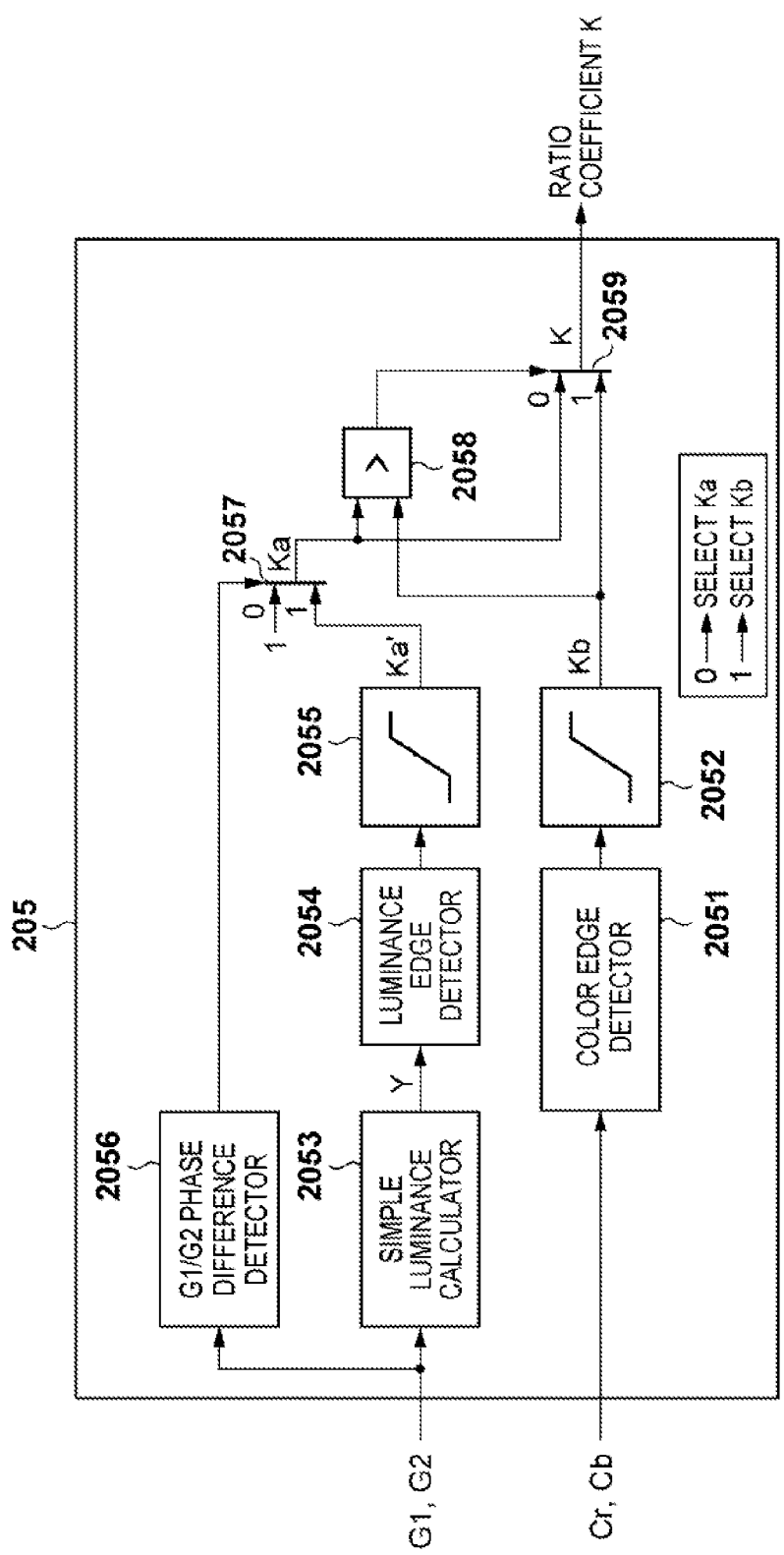
FIG. 3 is a block diagram showing a configuration example of a MIX ratio calculator 205 shown in FIG. 2.

FIG. 3 is a block diagram showing a configuration example of the MIX ratio calculators 205 and 225 shown in FIG. 2.

A color edge detector 2051 receives the color-difference signals Cr and Cb of a pixel of interest, and detects the degree of a steep change of each signal. The color edge detector 2051 can be implemented by, for example, a spatial filter having a filter coefficient [−1, 2, −1]. A coefficient Kb calculator 2052 maps one of filter application results as the color edge detection results, which presumably has a higher color edge degree, on a coefficient Kb (a second ratio coefficient) between 0 and 1 by using a predetermined function. For example, the coefficient Kb calculator outputs Kb having a value close to 1 for a filter application result probably having a high color edge degree, and Kb having a value close to 0 for a filter application result probably having a low degree.

The smaller the value of the coefficient Kb, the larger the weight that is given to a signal of a lower layer in signal combination. If Kb=0, therefore, the (up-sampled) color signal of the lower layer is directly supplied to an upper layer. If Kb=1, the color signal of the own layer is directly supplied to the upper layer. Within the range of 0<Kb<1, weighted combination is performed at a ratio of "signal of own layer:signal of lower layer=Kb:1−Kb". In the layer 241, for example, the adders 229 and 232 and multipliers 230 and 231 execute this weighted combination.

A portion where the detected color edge degree is small is a flat region in which the color change is small. In this region, a favorable noise suppressing effect is obtained by using a lower-layer signal as a low-frequency image, due to the noise suppressing effect of the processing of the color noise suppressor. Accordingly, the value of the coefficient Kb is decreased as the detected color edge degree decreases, so that the ratio of an image signal from a lower layer increases in signal combination.

A simple luminance calculator 2053 generates a luminance signal. As described previously, a luminance signal is generated by using the G signal by using the human specific luminous efficiency characteristic. For example, the simple luminance calculator 2053 can directly use the G signal obtained by the synchronizing process by the pixel interpolator 108, and can also generate, as the luminance signal Y, the average value (G1+G2)/2 of the G1 and G2 pixel signals included in a filter pattern containing a pixel to be processed.

A luminance edge detector 2054 detects the edges (leading edge and trailing edge) of the luminance signal Y. The luminance edge detector 2054 can be implemented by, for example, a spatial filter having a filter coefficient [−1, 0, 1]. A coefficient Ka' calculator 2055 maps the luminance edge detection results on a coefficient Ka' between 0 and 1. For example, the coefficient Ka' calculator outputs Ka' having a value close to 1 when the degree of the detected luminance edge is high, and Ka' having a value close to 0 when the degree is low.

The smaller the value of the coefficient Ka', the larger the weight that is given to a signal of a lower layer in signal combination. If Ka'=0, therefore, the (up-sampled) signal of the lower layer is directly supplied to an upper layer. If Ka'=1, the signal of the own layer is directly supplied to the upper layer. Within the range of 0<Ka'<1, weighted combination is performed at a ratio of "signal of own layer:signal of lower layer=Ka':1−Ka'". In the layer 241, for example, the adders 229 and 232 and multipliers 230 and 231 execute this weighted combination.

The coefficient Kb is an index indicating whether to weight a lower-layer image or present-layer image in image combination in order to suppress color noise. The coefficient Ka' is an index indicating whether to weight a lower-layer image and present-layer image in image combination in order to suppress a pseudo color. The value of the coefficient Ka' is decreased as the possibility of a pseudo color region increases.

Figure 4:
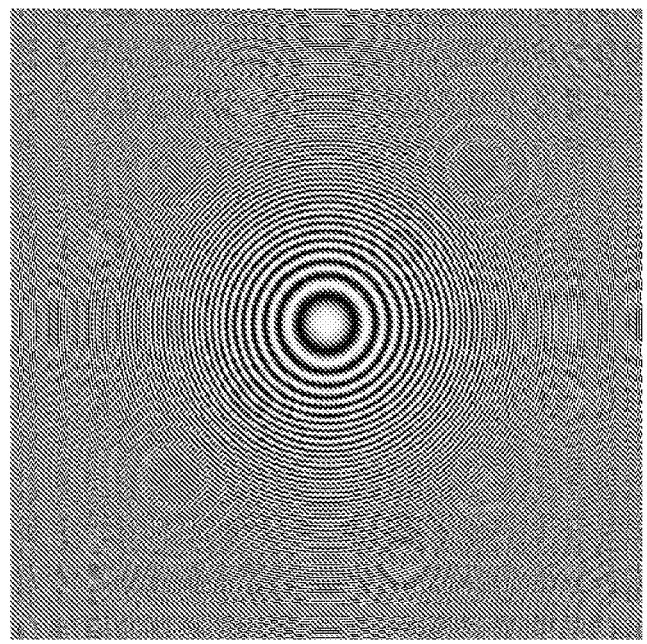
FIG. 4 is a view showing a CZP (Circular Zone Plate)

A method of estimating a pseudo color region will be explained below. FIG. 4 shows an image called a CZP (Circular Zone Plate) in which concentric circles having the center of the image as the origin are repeatedly arranged while the pitch is decreased (the spatial frequency rises from the center toward the outside). FIGS. 5A to 5C show that plot G1 and G2 signal values on an axis horizontally extending from the center of the CZP. The G1 signal value is obtained by interpolating a G1 pixel value, and the G2 signal value is obtained by interpolating a G2 signal value.

Referring to FIGS. 5A to 5C, the origin of the CZP is at the right end, and the spatial frequency increases leftward. Curves 1001 and 1002 shown in FIG. 5A indicate changes in G1 and G2 signals as input signals to the color-difference signal processor 109 shown in FIG. 2. Curves 1003 and 1004 shown in FIG. 5B indicate the states of the G1 and G2 signals after the low-pass filter 206 and down-sampling unit 207 are applied. Curves 1005 and 1006 shown in FIG. 5C indicate the states of the G1 and G2 signals after the low-pass filter 226 and down-sampling unit 227 are applied. Assume that in FIGS. 5A to 5C, interpolation is performed by enlarging the G1 and G2 signals of the images down-sampled by the down-sampling units 207 and 227 so that each signal has the same size as that of the input signal to the color-difference signal processor 109 shown in FIG. 2, in order to make explanation and understanding easy. Therefore, FIGS. 5A to 5C have a common abscissa.

Also, F0 to F4 shown in FIGS. 5A to 5C indicate arbitrary values of the spatial frequency in the CZP. That is, the spatial frequency at the center of the image (CZP) is F0, and the spatial frequency rises toward the outside of the image in the order of F1, F2, F3, and F4.

In each of FIGS. 5A to 5C, the G1 and G2 signals produce a phase difference in a high-frequency region. A region where the G1 and G2 signals produce a phase difference can be regarded as a pseudo color region (a region where a pseudo color signal is generated). Therefore, whether a region of interest is a pseudo color region can be determined by checking the presence/absence of a phase difference.

More specifically, inclinations (differences) ΔG1 and ΔG2 of the G1 and G2 pixels to adjacent (or nearby) pixels of the same kind in the Bayer arrangement are calculated. If the relationship between the inclinations satisfies $$\Delta G1 \times \Delta G2 < 0 \tag{1}$$

it is possible to determine that the region is a pseudo color region. That is, if the inclinations in the same direction are inverted, it is possible to determine that a phase difference exists.

Note that it is also possible to calculate inclinations in, for example, both the horizontal and vertical directions, and determine that the region is a pseudo color region if expression (1) is met in, for example, one of the horizontal and vertical directions. Whether the region is a pseudo color region can also be determined not for each pixel but for each region including a plurality of pixels. For example, if the ratio of pixels meeting expression (1) is equal to or higher than a predetermined threshold value in a given region, it is possible to determine that the region is a pseudo color region.

When the method as described above is applied to FIG. 5A, it is possible to determine that regions 2 to 4 where the spatial frequency is higher than F1 are pseudo color regions, for the G1 and G2 signals in the image input to the color-difference signal processor 109. For the G1 and G2 signals (FIG. 5B) of the image to which the low-pass filter 206 is applied, it is possible to determine that regions 3 and 4 where the spatial frequency is higher than F2 are pseudo color regions. For the G1 and G2 signals (FIG. 5C) of the image to which the low-pass filter 226 is applied, it is possible to determine that region 4 where the spatial frequency is higher than F3 is a pseudo color region. Accordingly, if the MIX ratio calculator 205 or 225 determines that there is a pseudo color region, the influence of the pseudo color can be suppressed by raising the combination ratio of a lower-layer signal in the color-difference signal as well.

A phase detector 2056 detects the production of a phase difference between the G1 and G2 signals by using the relationship indicated by expression 1, and determines that a pixel (or a region as described above) in which a phase difference is detected is a pseudo color region. The output from the phase detector 2056 is 0 or 1; the phase detector 2056 outputs 1 when a pseudo color region is found, and 0 when no pseudo color region is found.

A selector 2057 selects one of the coefficient Ka' calculated by the calculator 2055 and a fixed value of 1 as a coefficient Ka (a first ratio coefficient) for suppressing a pseudo color, in accordance with the determination result from the phase detector 2056. Consequently, not the coefficient Ka' but a fixed value of 1, that is, a combination ratio at which the present layer is 100% is selected as the coefficient Ka, for a pixel (or region) found to be no pseudo color region.

The coefficient Ka and the coefficient Kb calculated by the coefficient Kb calculator 2052 are input to a comparator 2058 and selector 2059. The comparator 2058 compares the coefficients Ka and Kb, and outputs 0 if Ka<Kb and 1 if Kb<Ka to the selector 2059. The selector 2059 selects the coefficient Ka if the value from the comparator 2058 is 0, and the coefficient Kb if the value is 1, as a combination coefficient K of the present layer. That is, from the coefficients Ka and Kb, a coefficient having a smaller value (a coefficient that increases the weight of a lower layer) is selected as the combination coefficient K of the present layer.

In this embodiment as described above, a low-resolution image having a resolution and spatial frequency band lower than those of an original image is generated from it. Then, the pseudo color suppressing process and color noise suppressing process are applied to color-difference signals of each of the original image and low-resolution image. After that, the resolution of the low-resolution image is restored, and the image is combined with the original image. In this process, the combination ratio of the low-resolution image is raised for at least a pseudo color region or a region (pixel) where the color change is small in the original image. This makes it possible to generate color-difference signals by effectively suppressing a pseudo color and color noise.

Other Embodiments

Note that when the number of layers is increased in the above-described embodiment, the processing of a low-resolution image having the second lowest resolution and second lowest frequency band is performed in the same manner as that of the layer 241, and the processing of a low-resolution image having the lowest resolution and lowest frequency band is performed in the same manner as that of the layer 242. Then, the processing of a low-resolution image having the third lowest resolution and third lowest frequency band is performed in the same manner as that of the layer 241, and the processing of the low-resolution image having the second lowest resolution and second lowest frequency band is performed in the same manner as that of the layer 242. An arbitrary number of layers can be processed by executing this processing in order.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, non-transitory computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-250257, filed on Nov. 8, 2010, which is hereby incorporated by reference herein its entirety.

The invention claimed is:

1. An image processing apparatus for suppressing a pseudo color and color noise of an image sensed by using a single board color image sensor, comprising:
a resolution reduction unit configured to generate, from a first image sensed by using the image sensor, a second image having a resolution and a frequency band lower than those of the first image;
a suppressing unit configured to suppress a pseudo color and color noise of each of the first and second images;
a resolution increase unit configured to restore the resolution of the second image processed by said suppressing unit;
a calculating unit configured to calculate a ratio coefficient for performing weighted combination on a pixel of the first image processed by said suppressing unit, and on a pixel, which corresponds to the former pixel, of the second image having the restored resolution; and
a combining unit configured to perform weighted combination on a color signal of the pixel of the first image processed by said suppressing unit, and on a color signal of the pixel, which corresponds to the former pixel, of the second image having the restored resolution, in accordance with the ratio coefficient,
wherein if it is determined that a pixel of interest of the first image belongs to a region where a pseudo color is generated, said calculating unit calculates a first ratio coefficient based on a luminance of the pixel of interest belonging the first image, and a second ratio coefficient based on a color of the pixel of interest belonging the first image, and selects one of the first coefficient and the second coefficient, which further increases a weight of the pixel of the second image having the restored resolution, as the ratio coefficient for use in the combination.

2. The apparatus according to claim 1, wherein said calculating unit calculates
the first ratio coefficient by which a weight of the pixel of the second image having the restored resolution increases as a degree of a luminance edge detected for the pixel of interest belonging to the first image decreases, and
the second ratio coefficient by which the weight of the pixel of the second image having the restored resolution increases as a degree of a color edge detected for the pixel of interest belonging to the first image decreases.

3. The apparatus according to claim 1, wherein
said image sensor comprises a color filter having a Bayer arrangement, and
said calculating unit determines that the pixel of interest belongs to the region where a pseudo color is generated, if it is determined that the pixel of interest belongs to a region where a phase difference exists between a luminance signal obtained from a G1 pixel and a luminance signal obtained from a G2 pixel in said color filter having the Bayer arrangement, and
wherein the G1 pixel is adjacent to an R (red) pixel in a horizontal direction and the G2 pixel is adjacent to a B (blue) pixel in the horizontal direction.

4. The apparatus according to claim 1, wherein
said resolution reduction unit generates a plurality of images in which a resolution and a frequency band are reduced stepwise, and
said suppressing unit, said resolution increase unit, said calculating unit, and said combining unit are configured to execute the operation, for each of the plurality of images, from a combination of a image having a second lowest resolution and a second lowest frequency band and an image having a lowest resolution and a lowest frequency band.

5. A control method of an image processing apparatus for suppressing a pseudo color and color noise of an image sensed by using a single board color image sensor, comprising:
a resolution reduction step of causing a resolution reduction unit to generate, from a first image sensed by using the image sensor, a second image having a resolution and a frequency band lower than those of the first image;
a suppression step of causing a suppressing unit to suppress a pseudo color and color noise of each of the first and second images;
a resolution increase step of causing a resolution increase unit to restore second of the low-resolution image processed in the suppression step;
a calculation step of causing a calculating unit to calculate a ratio coefficient for performing weighted combination on a pixel of the first image processed in the suppression step, and on a pixel, which corresponds to the former pixel, of the second image having the restored resolution; and
a combination step of causing a combining unit to perform weighted combination on a color signal of the pixel of the first image processed in the suppression step, and on a color signal of the pixel, which corresponds to the former pixel, of the second image having the restored resolution, in accordance with the ratio coefficient,
wherein if it is determined in the calculation step that a pixel of interest of the first image belongs to a region where a pseudo color is generated, the calculating unit calculates a first ration coefficient based on a luminance of the pixel of interest belonging the first image, and a second ratio coefficient based on a color of the pixel of interest belonging the first image, and selects one of the first coefficient and the second coefficient, which further increases a weight of the pixel of the second image having the restored resolution, as the ratio coefficient for use in the combination.

6. A non-transitory computer-readable storage medium that stores a program for causing a computer to function as each unit of an image processing apparatus cited in claim 1.

* * * * *